Nov. 3, 1925.　　　　　　　　　　　　　　　1,560,066
R. LIPPERT
HAM BOILER
Filed May 18, 1925　　　2 Sheets-Sheet 1
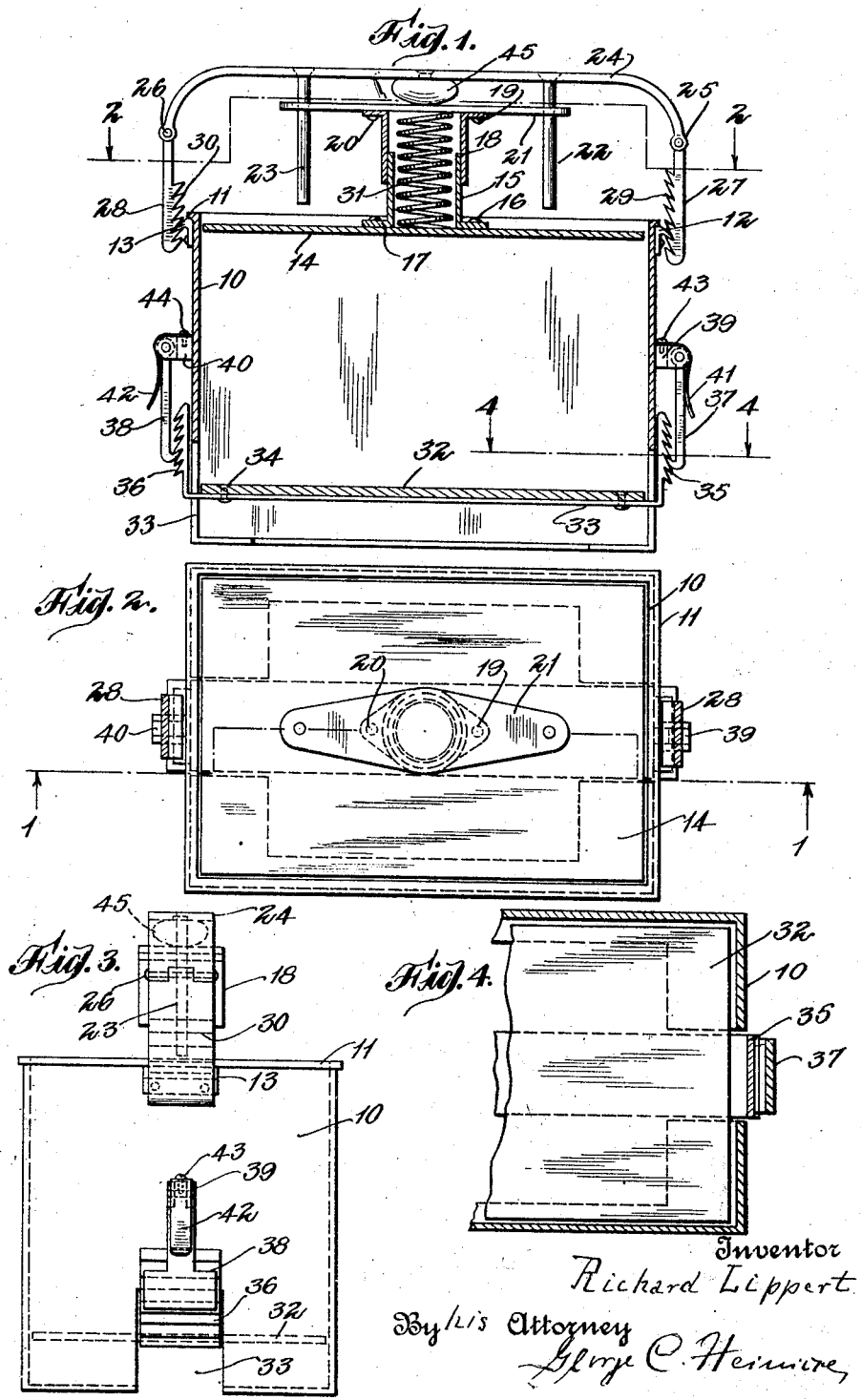

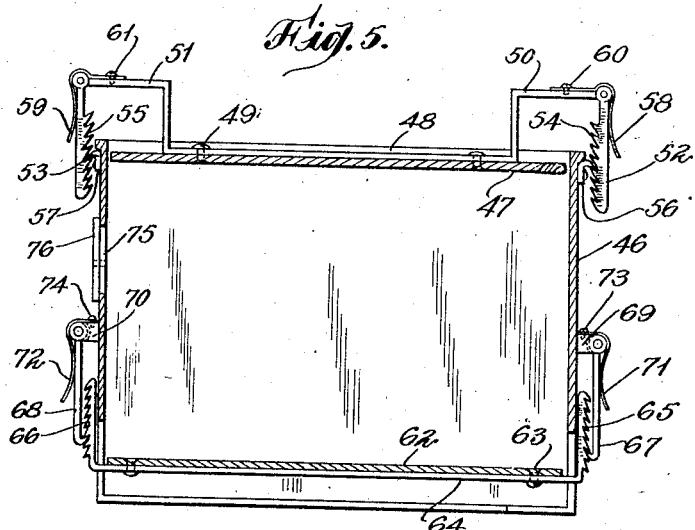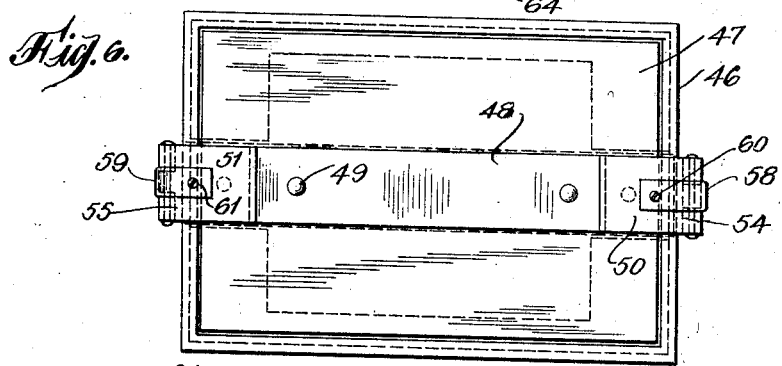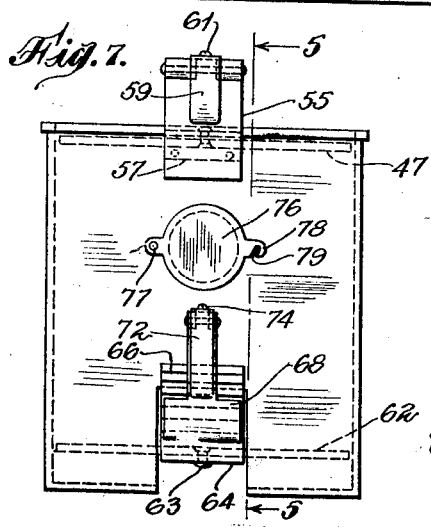

Patented Nov. 3, 1925.

1,560,066

UNITED STATES PATENT OFFICE.

RICHARD LIPPERT, OF NEW YORK, N. Y.

HAM BOILER.

Application filed May 18, 1925. Serial No. 31,083.

*To all whom it may concern:*

Be it known that I, RICHARD LIPPERT, a citizen of Germany, and resident of New York, in the county of New York and State of New York, have invented certain new and useful Ham Boilers, of which the following is a specification.

The present invention relates to improvements in meat boilers, particularly ham and sausage meat boilers, as they are described and shown, for instance, in my co-pending application Serial #19337, filed March 30th, 1925, and it is the principal object of the invention to provide a boiler in which the ham and meat are subjected to pressure from the top as well as from the bottom, in order to subject the meat to a thoroughly uniform pressure, and consequently obtaining a cooked ham or sausage of perfectly uniform consistence and not apt to crumble under the knife.

Another object of the invention is the provision of an improved ham boiler in which the meat during the cooking operation, is permanently under a uniform pressure from top and bottom and in fact, from all sides, for avoiding the necessity of subjecting the cooked ham to additional pressure after finish of the cooking process, and thus providing a novel and improved boiler resulting in a great saving in time and labor.

A further object of the invention is the provision of a ham boiler of comparatively simple and inexpensive construction, yet positively and effectively operating to achieve the desired result.

A still further object of the invention is the provision of a ham boiler made of a stainless metal, in order to avoid oxidation, and for giving the boiler at all times a clean and hygienic appearance and thus saving time in cleaning and preparing the boiler for new operations.

These and other objects and advantages of my invention will become more fully apparent as the description thereof proceeds, and will then be more specifically defined in the appended claims.

In the accompanying drawing forming a material part of this disclosure:

Fig. 1 is a front elevation of a boiler constructed according to my invention, partly in section on line 1—1 of Figure 2.

Fig. 2 is a top plan view thereof, seen in the direction of the arrows 2—2 of Figure 1.

Fig. 3 is an end view thereof.

Fig. 4 is a section on line 4—4 of Figure 1.

Fig. 5 shows a modified form of my boiler, particularly adapted for use as a sausage meat boiler, in section on line 5—5 of Figure 5.

Fig. 6 is a top plan view thereof.

Fig. 7 is an end view thereof.

The boiler comprises a container 10 preferably made of stainless metal, having an upper marginal flange 11, and teeth 12 and 13 attached to, or made integrally with its end walls.

Within the boiler a movable plate 14 is provided which has attached thereto at its upper face, a socket 15 by means of bolts 16, pasing through foot flange 17 of the socket.

A socket or sleeve 18 is telescoping with its lower end over the socket 15, and has its upper flange 19 secured by means of bolts or the like, 20, to a plate 21 guided near its outer end by means of rods or bars 22 and 23 attached to or made integrally at their upper ends with a handle 24 which has pivotally secured to its lower ends, as at 25 and 26, securing levers 27 and 28, having rack teeth 29 and 30, formed at their inner faces adapted to engage the upwardly slanting teeth 12 and 13.

A strong spiral spring 31 is arranged within sockets 15 and 18, resting with its lower end upon plate 14 and engaging with its upper end the lower face of plate 21.

Another movable lower plate 32 is arranged near the bottom of container 10, spaced therefrom, to which a band or bar is secured by means of rivets 34, or the like. The band 33 has its outer ends bent upwardly and provided with downwardly slanting teeth 35 and 36, adapted to be engaged by hooks 37 and 38, pivotally secured at their upper ends to brackets 39 and 40.

Springs 41 and 42, attached at their inner horizontally disposed ends, as at 43 and 44, to said brackets, engage with their inwardly curved vertical branches the outer faces of hooks 37 and 38 and press the same normally into engagement with the teeth 35 and 36.

A conical body 45 is secured to the bail 24 and engages with its end face the upper face of plate 21 above spring 31.

The device operates as follows:

The boned and defatted ham is placed into the container 10 above plate 32 and below plate 14. The upper movable plate 14 is then engaged with the ham by the proper operation of bail 24, which is depressed to a suitable degree, whereafter the parts are locked in their depressed positions by means of the engagement of the teeth 29 and 30, with the teeth of hooks 12 and 13. Thereafter the lower plate 32 is pressed upwardly against the lower face of the ham and then locked in its adjusted position by the engagement of hooks 37 and 38 with the rack teeth 35 and 36.

The ham will thus be held under a uniform pressure throughout within the container, and is then subjected to boiling in the ordinary well-known manner.

It will be clear that the boiler may be made in any desired size to suit the various sizes of the hams and quantities of sausage meat, and that the improved apparatus will do away with the requirement of after-pressing in a foot press, or the like, as the ham and meat are at all times under a perfectly uniform pressure in the boiler, thus resulting in an important saving in time and labor and special apparatus by avoiding repeated boiling or other work necessary with the existing boiler of this type.

In the modification illustrated in Figures 5 to 7 which is chiefly made for the compression of sausage meat, the container is designated 46, adapted to be closed by a movable cover 47, to the upper face of which a band 48 is secured by rivets 49, or the like. The outer ends of this band are first vertically bent upwardly and finally horizontally bent at right angles, as at 50 and 51. To the extreme outer ends of parts 50 and 51, levers 52 and 53 are pivotally secured having their inner faces formed with upwardly directed rack teeth 54 and 55, adapted to engage hooks 56 and 57. Springs 58 and 59 are attached at their horizontal branches, as at 60 and 61, to the bands 50 and 51, and are guided about the pivot points of levers 52 and 53 and normally press with their vertically disposed curved ends, the rack teeth 54 and 55 into engagement with the hooks 56 and 57.

The bottom 62 of the container is also movable, and has secured to its outer face, by means of rivets 63, or the like, a band 64, the upwardly bent outer ends of which are formed with rack teeth 65 and 66 adapted to be engaged by the hook ends of levers 67 and 68, pivotally attached at their upper ends to brackets 69 and 70, while springs 71 and 72 having their horizontal branches attached, as at 73 and 74, to brackets 69 and 70, are curved over the pivot points and engage with their substantially vertically disposed curved branches, the hooks 67 and 68 to normally press the same into engagement with the rack teeth 65 and 66.

The meat, in this form of my invention, is brought into the container by means of the usual sausage filler syringe through openings 75 in one of its end walls, which is then closed by means of a cover 76, pivotally attached, as at 77, to the end wall of the container while its opposite part has a hook 78 formed therewith adapted to engage over a pin 79.

The device operates as follows:

The meat is squirted into the container through the opening in the end wall thereof, which is then closed by means of the cover 76. Then the cover is pressed down to the desired degree and locked in its position, by the engagement between hooks 56 and 57, between the rack teeth 54 and 55. Then the bottom is moved upwardly to the desired degree and locked in its adjusted position by means of the engagement between hooks 67 and 68 between the rack teeth 65 and 66.

It is to be understood that the drawing and specification refer to the preferred forms of my device, and that the same is subject to many changes in its construction, such as fall within the scope of the appended claims without departure from the spirit of the invention and the principle involved.

Having thus described my invention, what I claim as new, and desire to secure by Letters Patent, is:—

1. A ham boiler comprising a container, a movable top plate and a movable bottom plate in said container, means for exerting a pressure upon the top plate and a means for exerting a pressure upon the bottom plate for exerting a uniform pressure upon the ham in said container, hooks on said container, a means engaging said hooks for locking said bottom plate in its pressure exerting position.

2. In a ham boiler, a movable top plate, a means for depressing said top plate, a means for locking said top plate in its depressed position, and a movable bottom plate in said container, a band attached to said bottom plate, a pair of brackets, levers pivoted on said brackets having hooked ends, said band by the co-operation of said levers, constituting a means for operating said movable bottom plate to press against the bottom of the ham in the container and a means for locking the parts in their adjusted positions.

3. In a ham boiler of the class described, the combination of an upper movable plate with a lower movable plate, bands attached to said upper and lower plates, hooks at the end walls of the boiler, levers having racks formed therewith pivotally attached to the band of the upper plate, said racks adapted to be engaged by said hooks, a rack formed with the band on the lower plate, a means for engaging said rack to hold the bottom plate in its adjusted pressure exerting position, and means for locking the parts in their adjusted positions.

4. In a ham boiler of the class described, the combination of an upper movable plate with a lower movable plate, a band having angularly formed ends attached to said upper plate, levers pivotally secured to the ends of said band, racks formed at the inner lever faces, hooks at the end walls of the boiler, adapted to be engaged by said racks and means for holding the parts in engagement, a band secured to said lower plate having angularly disposed ends, racks formed at said ends, a pair of brackets, and levers pivotally secured to said brackets, having lower hook ends adapted to engage in said racks, and means for locking the parts in their adjusted positions.

Signed at New York, in the county of New York and State of New York this 14th day of May, A. D. 1925.

RICHARD LIPPERT.